United States Patent
Sato et al.

(10) Patent No.: US 12,396,468 B2
(45) Date of Patent: Aug. 26, 2025

(54) CHOCOLATE FOOD

(71) Applicant: FUJI OIL HOLDINGS INC., Osaka (JP)

(72) Inventors: Yasuko Sato, Osaka (JP); Shimpei Watanabe, Osaka (JP); Nanako Kanda, Osaka (JP); Akiyuki Ishiwata, Osaka (JP)

(73) Assignee: FUJI OIL HOLDINGS INC., Osaka (JP)

( * ) Notice: Subject to any disclaimer, the term of this patent is extended or adjusted under 35 U.S.C. 154(b) by 1146 days.

(21) Appl. No.: 17/262,189

(22) PCT Filed: Jul. 23, 2019

(86) PCT No.: PCT/JP2019/028865
§ 371 (c)(1),
(2) Date: Jan. 21, 2021

(87) PCT Pub. No.: WO2020/022337
PCT Pub. Date: Jan. 30, 2020

(65) Prior Publication Data
US 2021/0289810 A1    Sep. 23, 2021

(30) Foreign Application Priority Data

Jul. 24, 2018 (JP) .................. 2018-138286

(51) Int. Cl.
A23G 1/36    (2006.01)
A23D 9/00    (2006.01)

(52) U.S. Cl.
CPC .................. *A23G 1/36* (2013.01); *A23D 9/00* (2013.01); *A23V 2002/00* (2013.01)

(58) Field of Classification Search
CPC ......... A23G 1/36; A23D 9/00; A23V 2002/00
See application file for complete search history.

(56) References Cited

FOREIGN PATENT DOCUMENTS

| | | | | |
|---|---|---|---|---|
| JP | 2005507028 | 3/2005 | | |
| JP | 2007319043 | 12/2007 | | |
| JP | 2008182961 | 8/2008 | | |
| JP | 2010142152 | 7/2010 | | |
| JP | 2010142153 | 7/2010 | | |
| JP | 2010532802 | 10/2010 | | |
| JP | 2011115075 | 6/2011 | | |
| JP | 2016116486 | 6/2016 | | |
| JP | 2019054750 A | * | 4/2019 | |
| WO | 2007129590 | 11/2007 | | |
| WO | 2009116396 | 9/2009 | | |
| WO | 2011138918 | 11/2011 | | |
| WO | WO-2015099160 A1 | * | 7/2015 | ........... A23D 7/0056 |
| WO | 2016133004 | 8/2016 | | |
| WO | 2018181159 | 10/2018 | | |

OTHER PUBLICATIONS

Dubois et al., "Fatty acid profiles of 80 vegetable oils with regard to their nutritional potential". Eur. J. Lipid Sci. Technol. 109 (2007) 710-732. (Year: 2007).*

"Office Action of Indonesia Counterpart Application" with English translation thereof, issued on Aug. 18, 2022, p. 1-p. 7.

"Written Opinion of the International Searching Authority (Form PCT/ISA/237)" of PCT/JP2019/028865, mailed on Oct. 21, 2019, with English translation thereof, pp. 1-19.

"Written Opinion of the International Searching Authority (Form PCT/ISA/237)" of PCT/JP2019/028865, mailed on Oct. 21, 2019, pp. 1-12.

"International Search Report (Form PCT/ISA/210) of PCT/JP2019/028865," mailed on Oct. 21, 2019, with English translation thereof, pp. 1-4.

Japan Oil Chemists' Society, "Table 8.2" of "The handbook of oil chemistry: lipids and surfactants," Maruzen Co., Ltd., Nov. 2001, pp. 1-3, with partial English translation thereof.

* cited by examiner

*Primary Examiner* — Michele L Jacobson
*Assistant Examiner* — Assaf Zilbering
(74) *Attorney, Agent, or Firm* — JCIPRNET

(57) ABSTRACT

The present invention addresses the problem of providing a chocolate-like food that has a reduced trans fatty acid content, has good compatibility with cocoa butter and good bloom resistance, and melts in the mouth. This chocolate-like food contains a transesterified oil/fat having a specific fatty acid composition and a cacao component.

6 Claims, No Drawings

CHOCOLATE FOOD

CROSS-REFERENCE TO RELATED APPLICATION

This application is a 371 application of the International PCT application serial no. PCT/JP2019/028865, filed on Jul. 23, 2019, which claims the priority benefit of Japan Patent Application No. 2018-138286, filed on Jul. 24, 2018. The entirety of each of the above-mentioned patent applications is hereby incorporated by reference herein and made a part of this specification.

TECHNICAL FIELD

The present invention relates to chocolate-like food using transesterified oils/fats, and particularly, to chocolate that is not tempered.

BACKGROUND ART

Hard butter, which is widely used as a cacao butter substitute, may be roughly classified as a tempering type hard butter that is subjected to a temperature control operation during solidification and a molding or non-tempering type hard butter that is not subjected to a temperature control operation. Tempering type hard butter contains a large amount of SUS type triglycerides (S: saturated fatty acid having 16 to 18 carbon atoms, U: monounsaturated fatty acid having 18 carbon atoms) contained in a large amount in cocoa butter, and has similar physical properties to cocoa butter. Therefore, compatibility with cocoa butter is high, and a similar texture to that of cocoa butter is obtained. However, since exact temperature control is required for the tempering operation, it is desirable to be able to omit this operation.

On the other hand, since non-tempering type hard butter does not require a complicated tempering operation, it can be suitably used for various combination foods obtained by combining chocolate with breads, Western-style cakes, and the like, and can be roughly classified as a trans fatty acid type hard butter, a transesterified and fractionated type hard butter, or a lauric acid type hard butter.

Among non-tempering type hard butters, trans acid type hard butter obtained by hydrogenating liquid oils such as soybean oil and rapeseed oil has been widely used because it has good mouthfeel properties and high compatibility with cocoa butter. However, in recent years, the risks of trans fatty acids to health have been clarified, and low trans fatty acid type hard butter containing no trans fatty acids is desirable.

Low trans acid type hard butter is desirable as described above, and in recent years, the development of transesterified and fractionated type hard butter has progressed (Patent Literature 1 to 4). For the transesterified and fractionated type hard butter, raw material oils/fats having a very low content of trans fatty acids, for example, extremely hardened oils such as soybean oil and rapeseed oil, and solid fats such as palm oil, are used as raw materials, and chemically or enzymatically transesterified, and then fractionated, and thus good mouthfeel properties are obtained. However, since the complicated production method results in high cost, cheaper hard butter is desired.

Lauric acid type hard butter has been produced using oils/fats containing an abundance of triglycerides containing a large amount of lauric acid as raw materials since a long time ago, and examples thereof include palm kernel oil fractionated hard oil and coconut oil. These have various advantages such as a texture and physical properties very similar to those of cacao butter, and favorable gloss. However, since severe blooming and graining may occur during storage, it is not possible to mix a large amount of cacao content and cocoa butter in.

Patent Literature 5 to 9 disclose oil/fat compositions for chocolate having a low trans acid content and containing lauric oils/fats.

CITATION LIST

Patent Literature

[Patent Literature 1]
  Published Japanese Translation No. 2005-507028 of the PCT International Publication
[Patent Literature 2]
  Published Japanese Translation No. 2010-532802 of the PCT International Publication
[Patent Literature 3]
  Japanese Patent Laid-Open No. 2007-319043
[Patent Literature 4]
  PCT International Publication No. WO2011/138918
[Patent Literature 5]
  Japanese Patent Laid-Open No. 2008-182961
[Patent Literature 6]
  Japanese Patent Laid-Open No. 2010-142152
[Patent Literature 7]
  Japanese Patent Laid-Open No. 2010-142153
[Patent Literature 8]
  Japanese Patent Laid-Open No. 2011-115075
[Patent Literature 9]
  Japanese Patent Laid-Open No. 2016-116486

SUMMARY OF INVENTION

Technical Problem

In recent years, consumers' demand for better flavor in chocolate has become stronger and stronger. Non-tempering type hard butter is desirable because of its good workability, and similarly, for chocolate for coating purposes, since not only physical properties such as workability and a solidification rate, but also quality in pursuit of flavor such as cacao sensation and chocolate sensation are required. A cacao sensation is a chocolate flavor that can be felt more strongly by increasing a proportion of cacao mass mixed into chocolate, and cacao mass is indispensable for imparting cacao sensation and a delicious chocolate flavor. However, about 55 mass % of cacao mass is cacao fat, and when a large amount of cacao mass is mixed in, a large amount of cacao fat is included at the same time, and fat blooming occurs in a coating process without tempering, and thus the proportion of cacao mass which can be mixed in is limited.

The inventors considered improvement of the quality and function of transesterified oils/fats having a low trans acid content. Oil/fat compositions for chocolate having a low trans acid content and containing no lauric oils/fats disclosed in Patent Literature 1 to 4 are likely to have a poor mouthfeel properties. In Patent Literature 5 to 9, although mouthfeel properties are relatively good, it is thought that further improvements in quality including with regard to the limitation on the amount of cocoa butter able to be mixed in, blooming resistance, and poor mouthfeel properties are necessary.

In view of the related art, an objective of the present invention is to provide chocolate-like food having a reduced content of trans fatty acids, and having excellent compatibility with cocoa butter and excellent blooming resistance, and having sharp melting-point properties and good mouthfeel properties.

Solution to Problem

The inventors conducted extensive studies in order to address the above problems, and as a result, found that the above objective can be achieved when, in the constituent fatty acid composition, the content of unsaturated fatty acids is set to 10 mass % or less, amounts of transesterified oils/fats adjusted according to the content specified for a composition of other fatty acids are included, and a specific amount of a cacao component is included, and thus completed the present invention.

That is, the present invention provides (1) a chocolate-like food containing 5 mass % to 50 mass % of transesterified oils/fats that satisfy all of (A) to (J) and 5 mass % to 50 mass % of a cacao component:
(A) the content of saturated fatty acids having 6 to 18 carbon atoms in the constituent fatty acid composition is 90 to 99.5 mass %,
(B) the content of saturated fatty acids having 6 to 10 carbon atoms in the constituent fatty acid composition is 6 to 18 mass %,
(C) the content of saturated fatty acids having 16 to 18 carbon atoms in the constituent fatty acid composition is 25 to 50 mass %,
(D) the content of saturated fatty acids having 12 or less carbon atoms in the constituent fatty acid composition is 35 to 60 mass %,
(E) the content of saturated fatty acids having 20 or more carbon atoms in the constituent fatty acid composition is 1 mass % or less,
(F) the content of lauric acid in the constituent fatty acid composition is 20 to 50 mass %,
(G) the content of palmitic acid in the constituent fatty acid composition is 20 to 38 mass %,
(H) the content of stearic acid in the constituent fatty acid composition is 3 to 20 mass %,
(I) the content of unsaturated fatty acids in the constituent fatty acid composition is 0.5 to 10 mass %, and
(J) the content of trans fatty acids in the constituent fatty acid composition is 5 mass % or less,
where, in fatty acid composition analysis for (A) to (J), fatty acids are propyl-esterified and analyzed.

(2) The chocolate-like food according to (1), wherein (content of CN48 or more)/(content of CN28 or less) of the transesterified oils/fats according to (1) is 1.5 to 20, where, CN48 or more: triglycerides in which a total number of carbon atoms of constituent fatty acids of triglycerides in oils/fats is 48 or more, and
CN28 or less: triglycerides in which a total number of carbon atoms of constituent fatty acids of triglycerides in oils/fats is 28 or less.

(3) The chocolate-like food according to (1) or (2), wherein the content of unsaturated fatty acids in the constituent fatty acid composition (I) according to (1) is 1 to 6 mass %.

(4) The chocolate-like food according to any one of (1) to (3), containing 5 mass % to 50 mass % of non-transesterified oils/fats that satisfy all of (a) to (c):
(a) the content of lauric acid in the constituent fatty acid composition is 20 to 70 mass %,
(b) the content of unsaturated fatty acids in the constituent fatty acid composition is 5 mass % or less, and
(c) the content of saturated fatty acids having 16 to 18 carbon atoms in the constituent fatty acid composition is 5 to 50 mass %,
where, in fatty acid composition analysis for (a) to (c), fatty acids are methyl-esterified and analyzed.

(5) The chocolate-like food according to (4), wherein a rising melting point of the non-transesterified oils/fats according to (4) is 30° C. or higher and 40° C. or lower.

(6) The chocolate-like food according to (4) or (5), wherein the content of saturated fatty acids having 16 to 18 carbon atoms in the constituent fatty acid composition (c) according to (4) is 10 to 25 mass %.

Advantageous Effects of Invention

According to the present invention, it is possible to obtain chocolate-like food having sharp melting-point properties and excellent blooming resistance.

In a preferable aspect, the transesterified oils/fats used in the present invention have a reduced content of saturated fatty acids having 16 or more carbon atoms that deteriorate mouthfeel properties, and have a high solidification rate and excellent workability during chocolate production.

According to the present invention, it is possible to produce chocolate having a reduced content of trans fatty acids, and without requiring a tempering operation, and having excellent compatibility with cocoa butter and excellent blooming resistance, and good mouthfeel properties.

In a more preferable aspect, when chocolate for coating is produced, if a large amount of cacao mass is mixed in, it is possible to provide chocolate for coating which does not require a tempering operation and has good mouthfeel properties and a delicious cacao sensation.

DESCRIPTION OF EMBODIMENTS

Hereinafter, the present invention will be described in more detail.

The chocolate-like food of the present invention contains 5 to 50 mass % of transesterified oils/fats. The chocolate-like food contains preferably 5 to 40 mass %, and more preferably 5 to 30 mass % of transesterified oils/fats. When the content of transesterified oils/fats is less than 5 mass %, when used for coating purposes, characteristics such as sharp mouthfeel properties, blooming resistance, an adequate solidification rate, gloss after solidification, and resistance to peeling off of the coated product when eaten may not be obtained. When the content exceeds 50 mass %, this is not preferable because, while the above characteristics can be obtained, a chocolate flavor becomes weak, good flavor may not be obtained, and an oily feeling may become strong.

The transesterified oils/fats used in the present invention are transesterified oils/fats that satisfy all of the following (A) to (J):
(A) the content of saturated fatty acids having 6 to 18 carbon atoms in the constituent fatty acid composition is 90 to 99.5 mass %,
(B) the content of saturated fatty acids having 6 to 10 carbon atoms in the constituent fatty acid composition is 6 to 18 mass %,
(C) the content of saturated fatty acids having 16 to 18 carbon atoms in the constituent fatty acid composition is 25 to 50 mass %, (D) the content of saturated fatty acids having 12 or less carbon atoms in the constituent fatty acid composition is 35 to 60 mass %,
(E) the content of saturated fatty acids having 20 or more carbon atoms in the constituent fatty acid composition is 1 mass % or less,
(F) the content of lauric acid in the constituent fatty acid composition is 20 to 50 mass %,
(G) the content of palmitic acid in the constituent fatty acid composition is 20 to 38 mass %,
(H) the content of stearic acid in the constituent fatty acid composition is 3 to 20 mass %,
(I) the content of unsaturated fatty acids in the constituent fatty acid composition is 0.5 to 10 mass %, and
(J) the content of trans fatty acids in the constituent fatty acid composition is 5 mass % or less,
where, in fatty acid composition analysis, fatty acids are propyl-esterified and analyzed.

A characteristic of transesterified oils/fats used in the present invention is that (I) the content of unsaturated fatty acids in the constituent fatty acid composition is 0.5 to 10 mass %, which is exemplified as an important difference from non-tempering hard butter obtained in the related art. The content is preferably 1 to 8 mass %, more preferably 1 to 7 mass %, still more preferably 1 to 6 mass %, and most preferably 1 to 5 mass %. When the content of unsaturated fatty acids exceeds 10 mass %, this is not desirable because the amount of triglycerides having a low melting point increases. When the content is less than 0.5 mass %, the amount of triglycerides having a low melting point may become too low. In addition, the content of oleic acid is preferably 0.5 to 7 mass %, more preferably 1 to 6 mass %, still more preferably 1 to 5 mass %, and most preferably 1 to 4 mass %. When the content of oleic acid exceeds 7 mass %, this is not desirable because the amount of triglycerides having a low melting point increases. When the content is less than 0.5 mass %, the amount of triglycerides having a low melting point may become too low. Although it is speculation, when (I) the content of unsaturated fatty acids in the constituent fatty acid composition is 0.5 to 10 mass %, or, alternatively, the content of saturated fatty acids having 6 to 10 carbon atoms in the constituent fatty acid composition is 6 to 18 mass %, lowering the melting point of the transesterified oils/fats is minimized and sharp melting-point properties are obtained. Since the production of triglycerides having a low melting point can be reduced, a required amount of triglycerides having a high melting point can be also minimized, and thus a good mouthfeel properties can be obtained when chocolate is produced. Reduction in the production of triglycerides having a low melting point and reduction in the production of triglycerides having a high melting point are also connected to acquisition of sharp melting-point properties without fractionation. When the content of saturated fatty acids having 6 to 10 carbon atoms exceeds 18 mass %, this is not desirable because the amount of triglycerides having a low melting point in the obtained transesterified oils/fats increases. In addition, when the content is less than 6 mass %, this is not desirable because the amount of triglycerides having a desired intermediate melting point decreases and sharp melting-point properties are not obtained. The content of saturated fatty acids having 6 to 10 carbon atoms is preferably 6 to 18 mass %, more preferably 6 to 15 mass %, still more preferably 7 to 15 mass %, and most preferably 8 to 15 mass %.

In the transesterified oils/fats used in the present invention, the content of saturated fatty acids having 6 to 18 carbon atoms in the constituent fatty acid composition is 90 to 99.5 mass % and preferably 95 to 99 mass %. When the content is less than 90 mass %, desired sharp melting-point properties of the transesterified oils/fats cannot be obtained. When the content exceeds 99.5 mass %, the amount of triglycerides having a low melting point may be too low.

In the transesterified oils/fats used in the present invention, the content of lauric acid in the constituent fatty acid composition is 20 to 50 mass %, preferably 25 to 50 mass %, more preferably 25 to 45 mass %, and still more preferably 30 to 45 mass %. When the content is less than 20 mass %, the relative content of stearic acid and palmitic acid in the saturated fatty acid content becomes higher, mouthfeel properties deteriorate, and sharp melting-point properties cannot be obtained. When the content of lauric acid exceeds 50 mass %, the relative content of stearic acid and palmitic acid in the saturated fatty acid content becomes lower, the SFC % in the entire temperature range is lowered, and sharp melting-point properties cannot be obtained.

In the transesterified oils/fats used in the present invention, the content of palmitic acid in the constituent fatty acid composition is 20 to 38 mass %, preferably 20 to 37 mass %, and more preferably 20 to 36 mass %. Within such a range, desired sharp melting-point properties can be obtained. When the content exceeds 38 mass %, this is not desirable because mouthfeel properties deteriorate.

In the transesterified oils/fats used in the present invention, the content of stearic acid in the constituent fatty acid composition is 3 to 20 mass %, and preferably 5 to 15 mass %. When the content exceeds 20 mass %, mouthfeel properties deteriorate, and desired transesterified oils/fats having good mouthfeel properties cannot be obtained. When the content is less than 3 mass %, sharp melting-point properties may not be obtained.

In the transesterified oils/fats used in the present invention, the content of saturated fatty acids having 16 to 18 carbon atoms in the constituent fatty acid composition is 25 to 50 mass % and preferably 30 to 50 mass %. When the content exceeds 50 mass %, mouthfeel properties deteriorate, and desired transesterified oils/fats having good mouthfeel properties cannot be obtained.

In the transesterified oils/fats used in the present invention, the content of saturated fatty acids having 12 or less carbon atoms in the constituent fatty acid composition is 35 to 60 mass % and preferably 35 to 50 mass %. When the content is less than 35 mass %, mouthfeel properties may deteriorate when the content of saturated fatty acids having 16 or more carbon atoms relatively increases. When the content of unsaturated fatty acids having 16 or more carbon atoms relatively increases, desired transesterified oils/fats having sharp melting-point properties may not be obtained. In addition, when the content exceeds 60 mass %, desired transesterified oils/fats having sharp melting-point properties may not be obtained.

In the transesterified oils/fats used in the present invention, the content of saturated fatty acids having 20 or more carbon atoms in the constituent fatty acid composition is 1 mass % or less, preferably 0.5 mass % or less, and more preferably 0.3 mass % or less. The transesterified oils/fats of the present invention have sharp melting-point properties and a good solidification rate even if the content of saturated fatty acids having 20 or more carbon atoms is 1 mass % or less.

In this specification, the fatty acid composition of transesterified oils/fats was measured by propyl esterifying fatty acid residues according to the method described in "The Collaborative Study on the Enzymatic Analysis of Positional Distribution of Short- and Medium-chain Fatty Acids in Milk Fat Using Immobilized *Candida Antarctica* Lipase B" reported by Yoshinaga et al. In a method which is generally performed and in which fatty acid residues are methyl-esterified using a strong alkali-methanol solution, particularly, in the short chain fatty acid content such as C6 to C8, few numerical values obtained by analysis may be detected, and the accuracy may be poor. When fatty acid composition analysis is performed by propylation, it is possible to address the above problem and highly accurate measurement can be performed.

In the transesterified oils/fats used in the present invention, (content of CN48 or more)/(content of CN28 or less) is preferably 20 or less, more preferably 1.5 to 20, still more preferably 2 to 20, yet more preferably 2 to 15, and most preferably 2 to 10. Being within such ranges is preferable because in that case desired sharp melting-point properties are likely to be obtained.

Where, CN48 or more: triglycerides in which a total number of carbon atoms of constituent fatty acids of triglycerides in oils/fats is 48 or more
CN28 or less: triglycerides in which a total number of carbon atoms of constituent fatty acids of triglycerides in oils/fats is 28 or less.

In the transesterified oils/fats used in the present invention, the content of CN30 to CN38 (triglycerides in which a total number of carbon atoms of constituent fatty acids of triglycerides in oils/fats is 30 to 38) is preferably 20 to 50 mass % and more preferably 20 to 40 mass %. When the content is 20 to 50 mass %, this is preferable because sharp melting-point properties are likely to be obtained. When the content is less than 20 mass %, the SFC % at 25° C. to 35° C. may decrease.

In the transesterified oils/fats used in the present invention, the content of CN48 or more (triglycerides in which a total number of carbon atoms of constituent fatty acids of triglycerides in oils/fats is 48 or more) is preferably 30 mass % or less, more preferably 5 to 30 mass %, and still more preferably 5 to 20 mass %. When the content exceeds 30 mass %, since the amount of triglycerides having a high melting point may increase if the content of saturated fatty acids is large, and the amount of triglycerides having a low melting point may increase if the content of unsaturated fatty acids is large, desired transesterified oils/fats having sharp melting-point properties may not be obtained.

In the transesterified oils/fats used in the present invention, the oils/fats to be used are not particularly limited as long as the above configuration is achieved, and are preferably obtained by transesterifying raw material oils/fats for transesterification by mixing the following oil/fat component X and oil/fat component Y.

The oil/fat component X is at least one oil/fat selected from among coconut oil, palm kernel oil and oils/fats obtained by processing them.

The oil/fat component Y is an oil/fat containing 40 mass % to 100 mass % of palm stearin.

Here, palm stearin means a palm oil fractionated hard part.

The transesterified oils/fats used in the present invention are more preferably a mixture of the following oil/fat component X and oil/fat component Y which is then transesterified. This is preferable because in this case adjustment of mixing conditions is easy.

The oil/fat component X is at least one oil/fat selected from among hardened coconut oil, palm kernel fractionated hardened oil, and palm kernel fractionated oil.

The oil/fat component Y is an oil/fat containing 40 mass % to 100 mass % of palm stearin.

The transesterified oils/fats used in the present invention is more preferably a mixture of the following oil/fat component X and oil/fat component Y which is then transesterified. When palm stearin having an iodine value of 20 or less is used, this is preferable because it is possible to reduce the content of unsaturated fatty acids in the (I) constituent fatty acid composition, and adjustment of mixing conditions is easy.

The oil/fat component X is at least one oil/fat selected from among hardened coconut oil, palm kernel fractionated hardened oil, and palm kernel fractionated oil.

The oil/fat component Y is an oil/fat containing 40 mass % to 100 mass % of palm stearin having an iodine value of 20 or less.

The transesterification method is classified as a method in which only fatty acids bound to the $1^{st}$ and $3^{rd}$ positions of triglycerides are specifically exchanged using an enzyme (lipase) (1,3-position specific transesterification method) or a method of performing unspecified exchange regardless of binding positions using an enzyme or a metal catalyst (for example, sodium methylate) (random transesterification). The latter random transesterification is preferable as the transesterification in the present invention. This is preferable because a larger amount of triglycerides is obtained, and thus the quality of untempered chocolate is stable over a long time.

In addition, chocolate-like foods referred to here are not limited to chocolates, quasi-chocolates, and chocolate-based foods defined in the National Chocolate Industry Fair Trade Association and the Chocolate-based food Fair Trade Association, and include oil/fat processed foods containing oils/fats as essential components and using cacao mass, cocoa, cacao butter, cacao butter substitute, hard butter, and the like.

The transesterified oils/fats used in the present invention preferably satisfy all of the following with respect to an SFC %. When these transesterified oils/fats are used in chocolate-like foods, this is preferable because mouthfeel properties are sharp and no remaining aftertaste is obtained.
 the SFC at 10° C. is 85% to 100%,
 the SFC at 20° C. is 60% to 80%,
 the SFC at 25° C. is 45% to 70%, and
 the SFC at 40° C. is 2% or less.

In the transesterified oils/fats used in the present invention, if (content of CN48 or more)/(content of CN28 or less) additionally satisfies 1.5 to 20, all of the following are satisfied with respect to an SFC % in a more preferable aspect:
 the SFC at 10° C. is 85% to 100%,
 the SFC at 20° C. is 60% to 80%,
 the SFC at 25° C. is 45% to 70%,
 the SFC at 30° C. is 25% to 50%,
 the SFC at 35° C. is 3% to 30%, and
 the SFC at 40° C. is 2% or less,
  where, CN48 or more: triglycerides in which a total number of carbon atoms of constituent fatty acids of triglycerides in oils/fats is 48 or more, and
  CN28 or less: triglycerides in which a total number of carbon atoms of constituent fatty acids of triglycerides in oils/fats is 28 or less.

In the transesterified oils/fats used in the present invention, additionally, when the content of unsaturated fatty acids in the constituent fatty acid composition is 1 to 6 mass %, all of the following are satisfied with respect to the SFC % in a more preferable aspect:
 the SFC at 10° C. is 85% to 100%,
 the SFC at 20° C. is 65% to 80%, the SFC at 25° C. is 50% to 70%,
the SFC at 30° C. is 25% to 50%,
the SFC at 35° C. is 5% to 30%, and
the SFC at 40° C. is 2% or less.

The chocolate-like food of the present invention contains 5 to 50 mass % of a cacao component. The chocolate-like food preferably contains 10 to 40 mass % of a cacao component. When the content of a cacao component is less than 5 mass %, this is not preferable because the chocolate flavor may not be obtained. When the content thereof exceeds 50 mass %, this is not preferable because the viscosity of the chocolate-like food becomes low and a coating operation may become difficult when used for coating purposes.

In this specification, the cacao component is a component obtained from cacao beans, and examples thereof include cacao butter, cacao mass and cocoa powder. Such cacao components may be used alone or in combination. Preferably, regarding the cacao component, it is preferable to contain 5 mass % to 50 mass % of cacao mass and/or cocoa powder. Even in this case, cacao butter may be used in order to adjust the content of oils/fats and chocolate flavor.

The chocolate-like food of the present invention preferably contains non-transesterified oils/fats that satisfy all of the following (a) to (c):
(a) the content of lauric acid in the constituent fatty acid composition is 20 to 70 mass %,
(b) the content of unsaturated fatty acids in the constituent fatty acid composition is 5 mass % or less, and
(c) the content of saturated fatty acids having 16 to 18 carbon atoms in the constituent fatty acid composition is 5 to 50 mass %.

The content of lauric acid in the constituent fatty acid composition of the non-transesterified oils/fats is preferably 30 to 65 mass %, and more preferably 40 to 60 mass %.

The content of unsaturated fatty acids in the constituent fatty acid composition of the non-transesterified oils/fats is preferably 4 mass % or less, more preferably 3 mass % or less, and still more preferably 2 mass % or less.

The content of saturated fatty acids having 16 to 18 carbon atoms in the constituent fatty acid composition of the non-transesterified oils/fats is preferably 10 to 45 mass %.

The non-transesterified oils/fats that can be used in the present invention may satisfy all of the above (a) to (c), and the rising melting point is preferably 30° C. or higher and 40° C. or lower. In oils/fats having a rising melting point of 30° C. or higher and lower than 40° C., the content of saturated fatty acids having 16 to 18 carbon atoms is preferably 10 to 25 mass %.

The non-transesterified oils/fats having a rising melting point of 30° C. or higher and 40° C. or lower can be used without limitation to the raw material oils/fats and the production method as long as the above numerical range is satisfied. Examples thereof include hardened oils of lauric oils/fats such as palm kernel oil and coconut oil, fractionated oils, hardened fractionated oils, fractionated hardened oils, processed oils/fats subjected to transesterification or the like, and mixed oils/fats thereof. Regarding preferable non-transesterified oils/fats, components having a high melting point obtained by separating palm kernel oil may be exemplified.

The chocolate-like food of the present invention contains transesterified oils/fats and a cacao component within the above numerical range, and thus it is possible to obtain chocolate-like food having excellent compatibility with cocoa butter and excellent blooming resistance and good mouthfeel properties. Preferably, the chocolate-like food further contains non-transesterified oils/fats that satisfy all of the above (a) to (c).

The chocolate-like food of the present invention may satisfy the above configuration, but oils/fats other than the above oils/fats can be used without limitation. Examples of available oils/fats include vegetable oils/fats such as rapeseed oil, soybean oil, sunflower seed oil, cottonseed oil, peanut oil, rice bran oil, corn oil, safflower oil, olive oil, kapok oil, sesame oil, evening primrose oil, palm oil, palm kernel oil, coconut oil, medium-chain fatty acid bound oil/fat (MCT), shea fat, and sal fat, animal oils/fats such as milk fat, beef tallow, lard, fish oil, and whale oil, and their hardened oil, fractionated oil, hardened fractionated oil, fractionated hardened oil, processed oils/fats subjected to transesterification or the like, and mixed oils/fats thereof.

The content of oils/fats in the chocolate-like food is preferably 30 to 70 mass % and more preferably 40 to 60 mass %. When the content of oils/fats is low, the viscosity of the chocolate-like food is too high, and a coating operation may become difficult when used for coating purposes. In addition, when the content of oils/fats is too large, this is not preferable because the chocolate flavor becomes weak, and the food may become oily.

As a method of producing chocolate-like food, general chocolate production methods can be used. Specifically, various powder foods such as sugars, cacao mass, cacao butter, cocoa powder, and milk powder, and raw materials such as emulsifiers, fragrances, and pigments can be appropriately selected, mixed, rolled and conched to obtain chocolate-like foods.

For the chocolate-like food of the present invention, emulsifiers that are generally used for producing chocolates can be used. Examples thereof include polyglycerin fatty acid ester, sucrose fatty acid ester, sorbitan fatty acid ester, organic acid monoglycerin fatty acid ester, polysorbate, and polyglycerin condensed ricinoleic acid ester. Two or more thereof may be used in combination.

Preferable applications of the chocolate-like food of the present invention are chocolate-like foods for coating. In the present invention, the chocolate-like food for coating is an oil/fat processed food in which oils/fats are in a continuous phase, and examples thereof include coating chocolate-like food for coating or covering the surface of confectioneries, bakery products, and the like.

In the present invention, composite foods coated using chocolate-like food for coating are not particularly limited as long as they are confectioneries or bakery products. Examples of confectioneries include manju, steamed adzuki-bean paste, castella, dorayaki, imagawayaki, taiyaki, kintsuba, waffles, kurimanju, mooncake, bolo, yatsuhashi, rice crackers, karinto, donut, sponge cake, roll cake, angel cake, pound cake, baumkuchen, fruitcake, madeleine, cream puff, eclair, millefeuille, apple pie, tart, biscuits, cookies, crackers, steamed bread, pretzels, wafers, snacks, pizza pies, crepe, souffle, and beignets, and confectioneries obtained by applying an oil/fat composition to fruits such as bananas, apples, and strawberries. Examples of breads include plain bread, koppe bread, fruit bread, corn bread, butter rolls, hamburger buns, French bread, bread rolls, sweet bread, sweet dough, hardtack, muffin, bagel, croissant, danish pastry, and nan. Although the chocolate-like food can be used for ice frozen desserts, the effects of the present invention are obtained when preferably used at room temperature.

In the present invention, in a method of using the chocolate-like food for coating, a coating operation is performed without tempering the melted chocolate-like food for coating. However, in conditions for coating, preferably, after coating in the melted state, cooling is performed to a refrigeration temperature of 15° C. or lower, and solidification is performed quickly.

EXAMPLES

Examples of the present invention will be described below, and the present invention will be described in more detail. Here, in the examples, both % and parts are based on mass.
(Analysis Method)
(Method of Analyzing Fatty Acid Composition by Propylation)
The fatty acid composition of oils/fats was propyl-esterified according to the method described in "The Collaborative Study on the Enzymatic Analysis of Positional Distribution of Short- and Medium-chain Fatty Acids in Milk Fat Using Immobilized *Candida Antarctica* Lipase B" reported by Yoshinaga et al., instead of general methyl esterification. Analysis by gas chromatography was performed according to a standard oil/fat analysis test method of the Japan Oil Chemists' Society.
(Triglyceride Composition Analysis Method)
A total number of carbon atoms of fatty acids constituting triglycerides in oils/fats was measured according to 'standard oil/fat analysis test method 2.4.6 triacylglycerin composition (gas chromatograph method)' of the Japan Oil Chemists' Society.
(SFC Measurement Method)
In the measurement of (SFC at each temperature) (solidification rate), the SFC was measured according to IUPAC.2 150 SOLID CONTENT DETERMINATION IN FATS BY NMR. "Minispec mq20" (commercially available from Bruker) was used as the analysis device.
(SFC Parallel Measurements at Each Temperature)
In order to evaluate dissolution characteristics, oil/fats were maintained at 80° C. for 10 minutes, and then maintained at 60° C. for 30 minutes, and thus the oils/fats were completely dissolved, and maintained at 0° C. for 1 hour and solidified. In addition, the oils/fats were maintained at a predetermined temperature (10° C., 20° C., 25° C., 30° C., 35° C., 40° C.) for 30 minutes and a solid fat content (SFC) was then measured.
(Solidification Rate)
Oils/fats were maintained at 80° C. for 10 minutes and then maintained at 60° C. for 30 minutes, and thus the oils/fats were completely dissolved, and stabilized at 20° C., and solid fat contents (SFC) after 3 minutes to 30 minutes were measured.

1.5 g of sodium methylate as a catalyst was added to 1.0 kg of raw material oils/fats prepared at ratios shown in Table 1, the mixture was subjected to random transesterification at 80° C. for 30 minutes, and then subjected to washing with water/decoloring/deodorizing according to general methods, and thereby transesterified oils/fats were obtained. The fatty acid composition was analyzed according to the above fatty acid composition analysis method, and the results are shown in Table 1. In addition, the triglyceride composition was analyzed according to the above triglyceride composition analysis method, and the results are shown in Table 2. Here, in Table 1, IV indicates the iodine value.

TABLE 1

| | | Example 1 | Example 2 | Example 3 | Example 4 | Example 5 | Example 6 | Example 7 |
|---|---|---|---|---|---|---|---|---|
| Raw material oils/fats | Palm stearin (IV12) | 35 | 30 | 25 | 20 | 15 | | 20 |
| | Extremely hardened coconut oil (IV<1) | 65 | 70 | 75 | 80 | 70 | 20 | 70 |
| | Palm stearin (IV30) | | | | | 6 | | 10 |
| | Extremely hardened palm oil (IV<1) | | | | | 9 | 30 | |
| | Coconut oil | | | | | | 50 | |
| | Extremely hardened rapeseed oil (IV<1) | | | | | | | |
| | High erucic acid extremely hardened rapeseed oil (IV<) | | | | | | | |
| | Rapeseed oil | | | | | | | |
| | Palm fractionated part having intermediate melting point (IV46) | | | | | | | |
| | Palm kernel extremely hardened oil (IV<1) | | | | | | | |
| | Transesterification reaction | Yes | Yes | Yes | Yes | Yes | Yes | Yes |
| Fatty acid composition | C6:0 | 0.2 | 0.2 | 0.2 | 0.3 | 0.2 | 0.2 | 0.2 |
| | C8:0 | 5.4 | 5.8 | 6.2 | 6.6 | 5.8 | 5.8 | 5.6 |
| | C10:0 | 4.1 | 4.3 | 4.7 | 5.0 | 4.3 | 4.3 | 4.3 |
| | C12:0 | 31.4 | 33.5 | 36.0 | 38.5 | 33.6 | 33.8 | 33.7 |
| | C14:0 | 12.0 | 12.9 | 13.6 | 14.4 | 13.1 | 13.0 | 12.9 |
| | C16:0 | 34.8 | 31.3 | 27.4 | 23.7 | 26.6 | 20.3 | 29.3 |

TABLE 1-continued

|  |  |  |  |  |  |  |  |  |
|---|---|---|---|---|---|---|---|---|
|  | C18:0 | 8.2 | 8.8 | 8.9 | 9.2 | 13.0 | 19.2 | 8.8 |
|  | C18:1 | 3.1 | 2.8 | 2.4 | 2.0 | 2.9 | 2.6 | 4.4 |
|  | C18:2 | 0.6 | 0.4 | 0.5 | 0.4 | 0.6 | 0.5 | 0.8 |
|  | C18:3 | 0.0 | 0.0 | 0.0 | 0.0 | 0.0 | 0.0 | 0.0 |
|  | C20:0 | 0.0 | 0.0 | 0.0 | 0.0 | 0.0 | 0.3 | 0.0 |
|  | C22:0 | 0.0 | 0.0 | 0.0 | 0.0 | 0.0 | 0.0 | 0.0 |
|  | C24:0 | 0.0 | 0.0 | 0.0 | 0.0 | 0.0 | 0.0 | 0.0 |
|  | Content of saturated fatty acids having 6 to 18 carbon atoms | 96.2 | 96.8 | 97.1 | 97.6 | 96.5 | 97.0 | 94.8 |
|  | Content of saturated fatty acids having 6 to 10 carbon atoms | 9.8 | 10.3 | 11.1 | 11.9 | 10.3 | 10.3 | 10.1 |
|  | Content of saturated fatty acids having 16 to 18 carbon atoms | 43.1 | 40.2 | 36.4 | 32.8 | 39.6 | 39.5 | 38.2 |
|  | Content of saturated fatty acids having 12 or less carbon atoms | 41.2 | 43.7 | 47.1 | 50.4 | 43.9 | 44.1 | 43.7 |
|  | Content of saturated fatty acids having 20 or more carbon atoms | 0.0 | 0.0 | 0.0 | 0.0 | 0.0 | 0.3 | 0.0 |
|  | Content of unsaturated fatty acids | 3.8 | 3.2 | 2.9 | 2.4 | 3.5 | 3.0 | 5.2 |
|  | Sum of content of saturated fatty acids having 6 to 10 carbon atoms and content of unsaturated fatty acids | 13.6 | 13.5 | 14.0 | 14.2 | 13.7 | 13.4 | 15.2 |
|  | Content of trans fatty acids | <1 | <1 | <1 | <1 | <1 | <1 | <1 |

|  |  | Example 8 | Example 9 | Comparative Example 1 | Comparative Example 2 | Comparative Example 3 | Comparative Example 4 | Comparative Example 5 |
|---|---|---|---|---|---|---|---|---|
| Raw material oils/fats | Palm stearin (IV12) | 15 | 10 |  | 40 |  |  |  |
|  | Extremely hardened coconut oil (IV<1) | 70 | 70 |  | 60 | 30 | 53 |  |
|  | Palm stearin (IV30) | 15 | 20 | 50 |  |  |  | 15 |
|  | Extremely hardened palm oil (IV<1) |  |  |  |  |  | 29 |  |
|  | Coconut oil |  |  | 40 |  | 40 |  |  |
|  | Extremely hardened rapeseed oil (IV<1) |  |  |  |  | 30 |  |  |
|  | High erucic acid extremely hardened rapeseed oil (IV<) |  |  | 10 |  |  |  |  |
|  | Rapeseed oil |  |  |  |  |  | 18 |  |
|  | Palm fractionated part having intermediate melting point (IV46) |  |  |  |  |  |  | 35 |
|  | Palm kernel extremely hardened oil (IV<1) |  |  |  |  |  |  | 50 |
|  | Transesterification reaction | Yes | Yes | Yes | Yes | Yes | Yes | Yes |
| Fatty acid composition | C6:0 | 0.2 | 0.2 | 0.1 | 0.2 | 0.2 | 0.1 | 0.0 |
|  | C8:0 | 5.6 | 5.6 | 4.1 | 5.0 | 5.8 | 4.4 | 1.9 |
|  | C10:0 | 4.3 | 4.3 | 3.1 | 3.7 | 4.3 | 3.3 | 1.7 |
|  | C12:0 | 33.5 | 33.6 | 24.6 | 28.7 | 34.0 | 25.9 | 23.4 |
|  | C14:0 | 12.9 | 13.0 | 9.8 | 11.1 | 12.8 | 10.1 | 8.3 |
|  | C16:0 | 28.4 | 27.3 | 29.7 | 38.8 | 7.7 | 18.5 | 31.6 |

TABLE 1-continued

|  | | | | | | | |
|---|---|---|---|---|---|---|---|
| C18:0 | 9.0 | 9.0 | 7.3 | 8.1 | 31.5 | 21.7 | 13.7 |
| C18:1 | 5.2 | 5.9 | 12.8 | 3.6 | 2.4 | 11.3 | 16.4 |
| C18:2 | 1.0 | 1.2 | 2.9 | 0.7 | 0.5 | 3.3 | 3.0 |
| C18:3 | 0.0 | 0.0 | 0.0 | 0.0 | 0.0 | 1.2 | 0.0 |
| C20:0 | 0.0 | 0.0 | 0.9 | 0.0 | 0.6 | 0.0 | 0.0 |
| C22:0 | 0.0 | 0.0 | 4.6 | 0.0 | 0.0 | 0.0 | 0.0 |
| C24:0 | 0.0 | 0.0 | 0.0 | 0.0 | 0.0 | 0.0 | 0.0 |
| Content of saturated fatty acids having 6 to 18 carbon atoms | 93.8 | 92.9 | 84.3 | 95.7 | 97.1 | 84.1 | 80.6 |
| Content of saturated fatty acids having 6 to 10 carbon atoms | 10.0 | 10.1 | 7.4 | 8.9 | 10.4 | 7.8 | 3.6 |
| Content of saturated fatty acids having 16 to 18 carbon atoms | 37.3 | 36.3 | 37.0 | 47.0 | 39.2 | 40.3 | 45.3 |
| Content of saturated fatty acids having 12 or less carbon atoms | 43.6 | 43.7 | 32.0 | 37.6 | 44.4 | 33.7 | 27.1 |
| Content of saturated fatty acids having 20 or more carbon atoms | 0.0 | 0.0 | 5.5 | 0.0 | 0.6 | 0.0 | 0.0 |
| Content of unsaturated fatty acids | 6.2 | 7.1 | 15.7 | 4.3 | 2.9 | 15.9 | 19.4 |
| Sum of content of saturated fatty acids having 6 to 10 carbon atoms and content of unsaturated fatty acids | 16.3 | 17.1 | 23.1 | 13.2 | 13.3 | 23.7 | 23.1 |
| Content of trans fatty acids | <1 | <1 | <1 | <1 | <1 | <1 | <1 |

(Evaluation of Fatty Acid Composition Analysis Value)

Evaluation was performed using numerical values of the following (A) to (J).

(A) the content of saturated fatty acids having 6 to 18 carbon atoms in the constituent fatty acid composition was 90 to 99.5 mass %
(B) the content of saturated fatty acids having 6 to 10 carbon atoms in the constituent fatty acid composition was 6 to 18 mass %
(C) the content of saturated fatty acids having 16 to 18 carbon atoms in the constituent fatty acid composition was 25 to 50 mass %
(D) the content of saturated fatty acids having 12 or less carbon atoms in the constituent fatty acid composition was 35 to 60 mass %
(E) the content of saturated fatty acids having 20 or more carbon atoms in the constituent fatty acid composition was 1 mass % or less
(F) the content of lauric acid in the constituent fatty acid composition was 20 to 50 mass %
(G) the content of palmitic acid in the constituent fatty acid composition was 20 to 38 mass %
(H) the content of stearic acid in the constituent fatty acid composition was 3 to 20 mass %
(I) the content of unsaturated fatty acids in the constituent fatty acid composition was 0.5 to 10 mass %
(J) the content of trans fatty acids in the constituent fatty acid composition was 5 mass % or less (Conclusion of Table 1)

The transesterified oils of Example 1 to Example 9 satisfied all of the numerical ranges of the above (A) to (J).

In Comparative Example 2, the content of palmitic acid was 38.8%, which did not satisfy (G).

In Comparative Example 3, the content of stearic acid was 31.5%, which did not satisfy (H). Here, although (E) was satisfied, the content of saturated fatty acids having 20 or more carbon atoms was 0.6 mass %.

In Comparative Example 1, the important (I) was not satisfied, and (A), (D), and (E) were likewise not satisfied.

In Comparative Example 4, the important (I) was not satisfied, and (A), (D), (G), and (H) were likewise not satisfied.

In Comparative Example 5, the important (I) was not satisfied, and (A), (B), and (D) were likewise not satisfied.

TABLE 2

| Triglyceride composition | Example 1 | Example 2 | Example 3 | Example 4 | Example 5 | Example 6 | Example 7 |
|---|---|---|---|---|---|---|---|
| CN22 | 0.2 | 0.3 | 0.4 | 0.5 | 0.2 | 0.3 | 0.3 |
| CN24 | 0.3 | 0.3 | 0.5 | 0.7 | 0.3 | 0.3 | 0.3 |
| CN26 | 1.0 | 1.0 | 1.5 | 1.9 | 1.0 | 1.0 | 1.1 |

TABLE 2-continued

| Triglyceride composition | | | | | | | |
|---|---|---|---|---|---|---|---|
| CN28 | 1.1 | 1.2 | 1.6 | 2.0 | 1.0 | 1.3 | 1.2 |
| CN30 | 1.7 | 1.8 | 2.2 | 2.6 | 1.8 | 1.7 | 1.9 |
| CN32 | 3.2 | 4.1 | 4.7 | 5.5 | 3.9 | 3.8 | 3.9 |
| CN34 | 4.1 | 5.0 | 5.7 | 6.6 | 4.8 | 4.7 | 4.8 |
| CN36 | 9.1 | 10.5 | 11.5 | 12.7 | 10.0 | 9.2 | 10.0 |
| CN38 | 9.6 | 10.8 | 11.7 | 12.7 | 10.8 | 10.8 | 10.7 |
| CN40 | 15.6 | 16.2 | 16.1 | 15.8 | 14.8 | 13.0 | 15.4 |
| CN42 | 13.9 | 14.3 | 14.2 | 13.9 | 14.9 | 15.3 | 14.6 |
| CN44 | 15.1 | 13.8 | 12.3 | 10.8 | 12.9 | 12.0 | 13.5 |
| CN46 | 11.5 | 10.2 | 9.0 | 7.7 | 11.0 | 11.0 | 10.8 |
| CN48 | 7.6 | 6.0 | 5.0 | 4.1 | 6.7 | 8.1 | 6.5 |
| CN50 | 4.3 | 3.2 | 2.5 | 2.0 | 3.7 | 4.1 | 3.6 |
| CN52 | 1.4 | 1.0 | 0.9 | 0.7 | 1.7 | 2.5 | 1.4 |
| CN54 | 0.2 | 0.1 | 0.0 | 0.0 | 0.3 | 0.9 | 0.2 |
| CN56 | 0.0 | 0.0 | 0.0 | 0.0 | 0.0 | 0.0 | 0.0 |
| CN58 or more | 0.0 | 0.0 | 0.0 | 0.0 | 0.0 | 0.0 | 0.0 |
| Content of CN30 to CN38 | 27.7 | 32.3 | 35.9 | 40.0 | 31.4 | 30.2 | 31.2 |
| Content of CN48 or more | 13.6 | 10.4 | 8.5 | 6.8 | 12.4 | 15.6 | 11.7 |
| Content of CN48 or more/content of CN 28 or less | 5.0 | 3.7 | 2.1 | 1.3 | 4.8 | 5.3 | 4.0 |

| Triglyceride composition | Example 8 | Example 9 | Comparative Example 1 | Comparative Example 2 | Comparative Example 3 | Comparative Example 4 | Comparative Example 5 |
|---|---|---|---|---|---|---|---|
| CN22 | 0.3 | 0.3 | 0.0 | 0.2 | 0.2 | 0.1 | 0.0 |
| CN24 | 0.4 | 0.4 | 0.0 | 0.3 | 0.3 | 0.2 | 0.1 |
| CN26 | 1.1 | 1.1 | 0.1 | 1.0 | 1.0 | 0.5 | 0.4 |
| CN28 | 1.3 | 1.3 | 0.2 | 1.0 | 1.4 | 0.8 | 0.4 |
| CN30 | 1.8 | 1.8 | 0.5 | 1.6 | 1.6 | 1.1 | 0.9 |
| CN32 | 3.9 | 3.9 | 0.7 | 2.9 | 3.8 | 2.4 | .3 |
| CN34 | 4.8 | 4.8 | 1.2 | 3.6 | 4.5 | 2.7 | 1.2 |
| CN36 | 9.9 | 9.8 | 2.4 | 8.2 | 7.8 | 5.2 | 3.2 |
| CN38 | 10.7 | 10.7 | 2.9 | 8.7 | 10.9 | 4.3 | 4.0 |
| CN40 | 15.2 | 14.8 | 5.9 | 15.2 | 9.6 | 9.0 | 8.0 |
| CN42 | 14.7 | 14.8 | 6.8 | 13.4 | 15.7 | 13.9 | 11.5 |
| CN44 | 13.2 | 13.0 | 10.4 | 16.2 | 12.1 | 12.4 | 12.7 |
| CN46 | 10.9 | 11.0 | 12.2 | 12.1 | 8.1 | 13.5 | 17.3 |
| CN48 | 6.5 | 6.7 | 12.6 | 8.7 | 12.4 | 14.8 | 15.0 |
| CN50 | 3.6 | 3.7 | 13.8 | 5.0 | 4.8 | 7.5 | 11.3 |
| CN52 | 1.5 | 1.6 | 10.6 | 1.5 | 2.4 | 6.8 | 9.2 |
| CN54 | 0.2 | 0.3 | 8.6 | 0.2 | 3.3 | 4.5 | 3.3 |
| CN56 | 0.0 | 0.0 | 6.0 | 0.0 | 0.2 | 0.2 | 0.1 |
| CN58 or more | 0.0 | 0.0 | 5.2 | 0.0 | 0.0 | 0.0 | 0.0 |
| Content of CN30 to CN38 | 31.2 | 31.0 | 7.7 | 25.1 | 28.6 | 15.8 | 10.6 |
| Content of CN48 or more | 11.9 | 12.3 | 56.7 | 15.4 | 23.0 | 33.8 | 39.0 |
| Content of CN48 or more/content of CN 28 or less | 4.0 | 4.0 | 189.3 | 6.0 | 7.8 | 21.9 | 43.9 |

(Evaluation of Triglyceride Analysis Value)
1, the content of CN30 to CN38 was 20 to 50 mass %
2, the content of CN48 or more was 30 mass % or less
3, (content of CN48 or more)/(content of CN28 or less) was 20 or less (Conclusion of Table 2)

Example 1 to Example 9, and Comparative Example 2 to Comparative Example 3 satisfied all of the numerical ranges of the above 1 to 3.

In Example 4, (content of CN48 or more)/(content of CN28 or less) was low at 1.3, and there was a possibility of a large amount of components having a relatively low melting point.

Comparative Example 1, and Comparative Example 4 to Comparative Example 5 did not satisfy all of the above 1 to 3.

The SFC of the oils/fats at each temperature was measured according to the above (SFC at each temperature) measurement method, and the results are shown in Table 3.

| Solid fat content | Example 1 | Example 2 | Example 3 | Example 4 | Example 5 | Example 6 | Example 7 |
|---|---|---|---|---|---|---|---|
| 10° C. | 91.7 | 89.8 | 89.2 | 87.8 | 90.2 | 91.5 | 89.2 |
| 20° C. | 73.8 | 71.1 | 68.8 | 64.6 | 72.1 | 71.5 | 69.6 |
| 25° C. | 58.6 | 56.5 | 51.3 | 45.9 | 55.6 | 55.3 | 52.2 |
| 30° C. | 38.8 | 33.7 | 29.2 | 23.0 | 34.5 | 33.9 | 31.1 |
| 35° C. | 14.8 | 9.6 | 5.4 | 1.5 | 10.5 | 10.8 | 7.7 |
| 40° C. | 0.2 | 0.0 | 0.0 | 0.0 | 0.1 | 0.2 | 0.0 |

| Solid fat content | Example 8 | Example 9 | Comparative Example 1 | Comparative Example 2 | Comparative Example 3 | Comparative Example 4 | Comparative Example 5 |
|---|---|---|---|---|---|---|---|
| 10° C. | 88.3 | 87.2 | 82.3 | 92.2 | 90.2 | 80.2 | 87.2 |
| 20° C. | 67.0 | 64.5 | 57.5 | 76.7 | 70.8 | 56.0 | 64.8 |
| 25° C. | 49.3 | 46.7 | 41.4 | 62.2 | 55.3 | 39.7 | 49.4 |
| 30° C. | 28.1 | 25.9 | 24.2 | 43.8 | 34.4 | 22.3 | 31.4 |
| 35° C. | 6.0 | 4.5 | 9.2 | 20.2 | 12.1 | 8.3 | 15.2 |
| 40° C. | 0.0 | 0.0 | 0.0 | 2.4 | 2.2 | 0.4 | 3.1 |

(Evaluation of SFC %)

When all of the following numerical ranges were satisfied, they were used as an index of sharp melting-point properties.
the SFC at 10° C. was 85% to 100%
the SFC at 20° C. was 60% to 80%
the SFC at 25° C. was 45% to 70%
the SFC at 40° C. was 2% or less When all of the following numerical ranges were satisfied, they were used as a more preferable index of sharp melting-point properties.
the SFC at 10° C. was 85% to 100%
the SFC at 20° C. was 60% to 80%
the SFC at 25° C. was 45% to 70%
the SFC at 30° C. was 25% to 50%
the SFC at 35° C. was 3% to 30%
the SFC at 40° C. was 2% or less When all of the following numerical ranges were satisfied, they were used as a still more preferable index of sharp melting-point properties.
the SFC at 10° C. was 85% to 100%
the SFC at 20° C. was 65% to 80%
the SFC at 25° C. was 50% to 70%
the SFC at 30° C. was 25% to 50%
the SFC at 35° C. was 5% to 30%
the SFC at 40° C. was 2% or less (Conclusion of Table 3)

In Example 1 to Example 9 in which all numerical ranges for evaluating the fatty acid composition analysis value and for evaluating the triglyceride composition analysis value were satisfied, sharp melting-point properties were obtained.

In Comparative Example 2 in which the content of palmitic acid was larger than 38 mass %, the SFC % at 35° C. was 2.4%, which was larger than 2%.

In Comparative Example 3 in which the content of stearic acid was larger than 20 mass %, the SFC % at 35° C. was 2.2%, which was larger than 2%.

In Comparative Example 1, and Comparative Example 4 to Comparative Example 5, sharp melting-point properties were not obtained.

In Example 1 to Example 3 and Example 5 to Example 9 except for Example 4, more preferable sharp melting-point properties were satisfied.

In Example 1 to Example 3 and Example 5 to Example 7 except for Example 4, and Example 8 to Example 9, still more preferable sharp melting-point properties were satisfied.

The solidification rate was measured according to the above (solidification rate) measurement method. The results are shown in Table 4.

| Solid fat content during cooling at 20° C. | Example 1 | Example 2 | Example 3 | Example 4 | Example 5 | Example 6 | Example 7 |
|---|---|---|---|---|---|---|---|
| 3 min | 3.1 | 1.6 | 0.2 | 0.1 | 2.1 | 3.3 | 0.4 |
| 6 min | 20.2 | 18.5 | 9.5 | 3.7 | 18.2 | 14.8 | 13.3 |
| 10 min | 41.2 | 42.6 | 34.4 | 25.3 | 41.3 | 38.7 | 37.5 |
| 20 min | 57.0 | 56.2 | 51.3 | 46.8 | 54.9 | 54.2 | 52.1 |
| 30 min | 59.0 | 58.2 | 53.9 | 50.2 | 57.0 | 57.0 | 54.2 |

| Solid fat content during cooling at 20° C. | Example 8 | Example 9 | Comparative Example 1 | Comparative Example 2 | Comparative Example 3 | Comparative Example 4 | Comparative Example 5 |
|---|---|---|---|---|---|---|---|
| 3 min | 0.0 | 0.2 | 3.7 | 7.3 | 7.0 | 4.3 | 7.0 |
| 6 min | 8.5 | 6.9 | 10.7 | 28.9 | 14.2 | 10.8 | 22.8 |

| | | | | | | | |
|---|---|---|---|---|---|---|---|
| 10 min | 33.3 | 31.3 | 13.3 | 47.6 | 29.3 | 28.4 | 37.8 |
| 20 min | 49.4 | 47.4 | 39.9 | 59.3 | 54.3 | 40.5 | 47.2 |
| 30 min | 52.0 | 49.9 | 43.5 | 61.2 | 57.3 | 42.2 | 48.6 |

(Conclusion of Table 4)

In Example 1 to Example 9 in which configuration requirements were satisfied, the solid fat content after 10 minutes was larger than 20%, and good results were obtained.

In Comparative Example 1 containing saturated fatty acids having 20 or more carbon atoms, the solid fat content after 10 minutes was low at 13.3%, and the solidification rate required for hard butter was poor.

(Evaluation by Chocolate Test)

Evaluation was performed using the transesterified oils/fats produced above according to the chocolate test.

Oils/Fats Used for the Chocolate Test (Transesterified Oils/Fats)

Transesterified oils/fats of Example 2 and transesterified oils/fats of Comparative Example 1 were used.

(Non-Transesterified Lauric Oils/Fats A)

Palkena H (commercially available from Fuji Oil Co., Ltd.) which is a cured type of palm kernel oil stearin and is used as a cocoa butter substitute (CBS) was used as non-transesterified lauric oils/fats A.

The rising melting point was 35.0° C. The fatty acid composition is shown in Table 5.

TABLE 5

| | C8 | C10 | C12 | C14 | C16 | C18 | C18:1 | C18:2 | Other |
|---|---|---|---|---|---|---|---|---|---|
| Palkena H | 1.7 | 2.6 | 55.0 | 22.0 | 8.5 | 9.3 | 0.7 | 0.1 | 0.1 |

Chocolate was produced according to the formulation of Table 6. In addition, Table 6 shows measured values of the chocolate produced according to (measurement method).

(Measurement Method)

(Average Particle Size)

The particle size was measured when the chocolate-like food (when the oil content was less than 50%, the oil content was adjusted to 50 to 60% by performing dilution with liquid oil) was attached to the measurement surface of a micrometer (commercially available from Mitutoyo Corporation, product name "digimatic standard outside micrometer MDC-25PJ"), the measurement surfaces were attached to each other, and the chocolate-like food protruded from the measurement surface. The particle size was measured 5 times, and the average value of three measured values excluding the maximum and minimum values was used as the average particle size.

(Viscosity)

The product temperature of the chocolate-like food was adjusted to 45° C., and using a BM type viscometer (commercially available from Tokyo Keiki Co., Ltd.), in the case of 10,000 cP or less, the viscosity was measured with a No. 3 rotor at 12 rpm, and in the case of larger than 10,000 cP, the viscosity was measured with a No. 4 rotor at 12 rpm.

TABLE 6

| | Example 10 | Example 11 | Comparative Example 6 | Comparative Example 7 |
|---|---|---|---|---|
| Cacao mass | 2.0% | 2.0% | 2.0% | 2.0% |
| Cocoa powder | 19.0% | 19.0% | 19.0% | 19.0% |
| Sugar | 39.5% | 39.5% | 39.5% | 39.5% |
| Cacao butter | 0.5% | 0.5% | 0.5% | 0.5% |
| Transesterified oils/fats of Example 1 | 39.0% | 19.5% | 0.0% | 0.0% |
| Non-transesterified lauric oils/fats A | 0.0% | 19.5% | 39.0% | 0.0% |
| Transesterified oils/fats of Comparative Example 1 | 0.0% | 0.0% | 0.0% | 39.0% |
| Lecithin | 0.20% | 0.20% | 0.20% | 0.20% |
| Vanilla fragrance | 0.03% | 0.03% | 0.03% | 0.03% |
| Particle size/μ | 22 | 22 | 22 | 22 |
| Viscosity/cP | 3,300 | 3,300 | 3,300 | 3,300 |

(Evaluation of Blooming Resistance)

The chocolate was completely melted and then adjusted to 50° C., and about 15 g of the chocolate was filled into a plastic cup, and immediately cooled at 5° C. The chocolate was solidified at 5° C. overnight, and then left at 20° C. overnight, and stored in a constant temperature incubator at 15° C., and the change over time was observed. The numbers of days from when the test started until blooming occurred are summarized in Table 7.

Those in which no blooming occurred until the 45th day were marked with satisfactory "○."

TABLE 7

| | Example 10 | Example 11 | Comparative Example 6 | Comparative Example 7 |
|---|---|---|---|---|
| Number of days elapsed | 59 days | 90 days or longer | 21 days | 59 days |
| Evaluation result | ○ | ○ | x | ○ |

(Conclusion of Table 7)

Comparative Example 6 had poor blooming resistance.

(Chocolate Coating Test)

The produced chocolate was evaluated by a coating test. The evaluation method was performed according to (Coating test evaluation method). The evaluation results are summarized in Table 8.

(Coating Test Evaluation Method)

(Drying Time)

The chocolate was completely melted and then adjusted to 50° C., and coated on a commercially available donut, and a time until it was solidified at room temperature (22° C.) was measured for evaluation.

(Mouthfeel Properties)

The chocolate was coated on a commercially available donut, and stored at 20° C. for 1 day, and then tasted, and evaluated according to the following evaluation criteria.

3 points: mouthfeel properties were very good, it felt cold, and aftertaste was not felt.

2 points: mouthfeel properties were good, and aftertaste was not felt.
1 point: mouthfeel properties were poor and aftertaste was felt.

(Gloss)

The chocolate was coated on a commercially available donut, and the condition after storage at 20° C. for 1 day was visually evaluated.

(Heat Resistance)

Chocolate was completely melted and then adjusted to 50° C., and coated on a commercially available donut, and cooled and solidified at 5° C. for 2 minutes, and then stored in an incubator at 28° C. After 14 days, the heat resistance was evaluated based on whether the chocolate coating was sticky.
○: Good heat resistance without stickiness
x: Poor heat resistance with stickiness.

TABLE 8

|  | Example 10 | Example 11 | Comparative Example 6 | Comparative Example 7 |
|---|---|---|---|---|
| Drying time/min | 4.0 | 3.5 | 3.5 | 4.0 |
| Mouthfeel properties | 2 | 3 | 3 | 1 |
| Gloss | Good | Good | Good | Good |
| Heat resistance |  |  |  |  |

(Conclusion of Table 8)

The drying time was within the allowable range, and Example 11 and Comparative Example 6 were slightly faster.

Example 11 and Comparative Example 6 had very good mouthfeel properties.

Example 10 had good mouthfeel properties without aftertaste.

Comparative Example 7 had poor mouthfeel properties and aftertaste was felt.

Both gloss and heat resistance were good without much difference.

(Overall Evaluation)

Overall evaluation was performed. 5-point evaluation was performed with 5 points for the highest and 1 point for the lowest. A score of 3 points or more was evaluated to be satisfactory. The evaluation results are shown in Table 9.

TABLE 9

|  | Example 10 | Example 11 | Comparative Example 6 | Comparative Example 7 |
|---|---|---|---|---|
| Overall evaluation | 4 | 5 | 2 | 1 |

(Conclusion of Table 9)

The overall evaluation results of the comparative examples were not satisfactory.

Example 11 had better drying time, mouthfeel properties, and blooming resistance.

Comparative Example 6 had poor blooming resistance.
Comparative Example 7 had poor mouthfeel properties.

INDUSTRIAL APPLICABILITY

The present invention can be suitably used for chocolate-like food using transesterified oil s/fats, which exhibits sharp solubility, and particularly, chocolate that is not tempered.

What is claimed is:

1. A chocolate food containing 5 mass % to 50 mass % of transesterified oils/fats that satisfy all of (A) to (J) and 5 mass % to 50 mass of a cacao component:
   (A) the content of saturated fatty acids having 6 to 18 carbon atoms in the constituent fatty acid composition is 90 to 99.5 mass %,
   (B) the content of saturated fatty acids having 6 to 10 carbon atoms in the constituent fatty acid composition is 6 to 18 mass %,
   (C) the content of saturated fatty acids having 16 to 18 carbon atoms in the constituent fatty acid composition is 25 to 50 mass %,
   (D) the content of saturated fatty acids having 12 or less carbon atoms in the constituent fatty acid composition is 35 to 60 mass %,
   (E) the content of saturated fatty acids having 20 or more carbon atoms in the constituent fatty acid composition is 1 mass % or less,
   (F) the content of lauric acid in the constituent fatty acid composition is 20 to 50 mass %,
   (G) the content of palmitic acid in the constituent fatty acid composition is 20 to 38 mass %,
   (H) the content of stearic acid in the constituent fatty acid composition is 3 to 20 mass %,
   (I) the content of unsaturated fatty acids in the constituent fatty acid composition is 0.5 to 10 mass %, and
   (J) the content of trans fatty acids in the constituent fatty acid composition is 5 mass % or less,
   where, in fatty acid composition analysis for (A) to (J), fatty acids are propyl-esterified and analyzed.

2. The chocolate food according to claim 1,
   wherein (content of CN48 or more)/(content of CN28 or less) of the transesterified oils/fats is 1.5 to 20,
   where, CN48 or more: triglycerides in which a total number of carbon atoms of constituent fatty acids of triglycerides in oils/fats is 48 or more, and
   CN28 or less: triglycerides in which a total number of carbon atoms of constituent fatty acids of triglycerides in oils/fats is 28 or less.

3. The chocolate food according to claim 1,
   wherein the content of unsaturated fatty acids in the constituent fatty acid composition (I) is 1 to 6 mass %.

4. The chocolate food according to claim 1, containing 5 mass % to 50 mass % of non-transesterified oils/fats that satisfy all of (a) to (c):
   (a) the content of lauric acid in the constituent fatty acid composition is 20 to 70 mass %,
   (b) the content of unsaturated fatty acids in the constituent fatty acid composition is 5 mass % or less, and
   (c) the content of saturated fatty acids having 16 to 18 carbon atoms in the constituent fatty acid composition is 5 to 50 mass %,
   where, in fatty acid composition analysis for (a) to (c), fatty acids are methyl-esterified and analyzed.

5. The chocolate food according to claim 4,
   wherein a rising melting point of the non-transesterified oils/fats is 30° C. or higher and 40° C. or lower.

6. The chocolate food according to claim 4,
   wherein the content of saturated fatty acids having 16 to 18 carbon atoms in the constituent fatty acid composition (c) is 10 to 25 mass %.

* * * * *